(12) United States Patent
Diessner

(10) Patent No.: US 11,648,877 B2
(45) Date of Patent: *May 16, 2023

(54) METHOD FOR DETECTING AN OBJECT VIA A VEHICULAR VISION SYSTEM

(71) Applicant: MAGNA ELECTRONICS INC., Auburn Hills, MI (US)

(72) Inventor: Horst D. Diessner, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/304,029

(22) Filed: Jun. 14, 2021

(65) Prior Publication Data

US 2021/0300245 A1    Sep. 30, 2021

Related U.S. Application Data

(63) Continuation of application No. 15/886,871, filed on Feb. 2, 2018, now Pat. No. 11,034,295.
(Continued)

(51) Int. Cl.
*B60R 1/00* (2022.01)
*G05D 1/02* (2020.01)
(Continued)

(52) U.S. Cl.
CPC .............. *B60R 1/00* (2013.01); *G05D 1/0251* (2013.01); *H04N 7/181* (2013.01); *B60R 2300/105* (2013.01); *B60R 2300/20* (2013.01); *B60R 2300/30* (2013.01); *B60R 2300/303* (2013.01); *B60R 2300/802* (2013.01);
(Continued)

(58) Field of Classification Search
CPC . B60R 1/00; B60R 2300/105; B60R 2300/20; B60R 2300/30; B60R 2300/303; B60R 2300/802; B60R 2300/8026; B60R 2300/806; B60R 2300/8066;
(Continued)

(56) References Cited

U.S. PATENT DOCUMENTS 5,289,321 A    2/1994 Secor
5,550,677 A    8/1996 Schofield et al.
(Continued)

*Primary Examiner* — Jonathan M Dager
*Assistant Examiner* — Jean W Charleston
(74) *Attorney, Agent, or Firm* — Honigman LLP

(57) ABSTRACT

A method for detecting an object via a vehicular vision system includes disposing first and second cameras at respective locations at a vehicle so as to have respective first and second fields of view rearward of the vehicle. The locations are vertically and horizontally spaced apart by respective vertical and horizontal separation distances. With the first and second cameras disposed at the respective locations, the first field of view at least partially overlaps the second field of view. An electronic control unit (ECU) is provided that includes an image processor. Image data is captured by the cameras and provided to the ECU and processed at the ECU. The ECU, responsive to processing of captured image data and based on the separation distances, determines presence of an object in the overlapping region of the first and second fields of view and determines the location of the object relative to the vehicle.

24 Claims, 3 Drawing Sheets

Related U.S. Application Data

(60) Provisional application No. 62/453,761, filed on Feb. 2, 2017.

(51) Int. Cl.
  *H04N 7/18* (2006.01)
  *G06V 20/56* (2022.01)
  *G06V 20/58* (2022.01)

(52) U.S. Cl.
  CPC ... *B60R 2300/806* (2013.01); *B60R 2300/808* (2013.01); *B60R 2300/8026* (2013.01); *B60R 2300/8066* (2013.01); *G06V 20/56* (2022.01); *G06V 20/58* (2022.01); *H04N 7/18* (2013.01)

(58) Field of Classification Search
  CPC ............ B60R 2300/808; G05D 1/0251; H04N 7/181; H04N 7/18; G06V 20/56; G06V 20/58
  USPC .......................................................... 701/28
  See application file for complete search history.

(56) References Cited

U.S. PATENT DOCUMENTS

| | | | |
|---|---|---|---|
| 5,670,935 | A | 9/1997 | Schofield et al. |
| 5,949,331 | A | 9/1999 | Schofield et al. |
| 6,690,268 | B2 | 2/2004 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,874,317 | B2 | 10/2014 | Marczok et al. |
| 9,085,261 | B2 * | 7/2015 | Lu ........................... B62D 13/06 |
| 9,558,409 | B2 * | 1/2017 | Pliefke ................. G06V 20/588 |
| 10,071,687 | B2 | 9/2018 | Ihlenburg et al. |
| 10,099,614 | B2 | 10/2018 | Diessner |
| 11,034,295 | B2 | 6/2021 | Diessner |
| 2005/0238203 | A1 | 10/2005 | Yoshimura |
| 2013/0286193 | A1 * | 10/2013 | Pflug ....................... B60R 1/002 348/148 |
| 2014/0055616 | A1 * | 2/2014 | Corcoran ........... H04N 5/23296 348/148 |
| 2014/0071279 | A1 | 3/2014 | Mokashi et al. |
| 2014/0085472 | A1 | 3/2014 | Lu et al. |
| 2014/0160276 | A1 | 6/2014 | Pliefke et al. |
| 2014/0247352 | A1 * | 9/2014 | Rathi .................... G06V 20/588 348/148 |
| 2015/0002670 | A1 | 1/2015 | Bajpai |
| 2015/0201120 | A1 * | 7/2015 | Irie .......................... G06T 7/254 348/148 |
| 2015/0210312 | A1 * | 7/2015 | Stein ........................ B62D 6/00 701/41 |
| 2015/0217693 | A1 | 8/2015 | Pliefke et al. |
| 2015/0343950 | A1 * | 12/2015 | Heinemann ............... B60R 1/00 348/148 |
| 2015/0344028 | A1 | 12/2015 | Gieseke et al. |
| 2016/0044284 | A1 * | 2/2016 | Goseberg ................ G06F 3/013 348/148 |
| 2016/0119587 | A1 * | 4/2016 | Tan ........................ H04N 7/181 348/148 |
| 2017/0015312 | A1 | 1/2017 | Latotzki |
| 2017/0017848 | A1 | 1/2017 | Gupta et al. |
| 2017/0050672 | A1 | 2/2017 | Gieseke et al. |
| 2017/0217372 | A1 | 8/2017 | Lu et al. |
| 2017/0253237 | A1 | 9/2017 | Diessner |
| 2017/0254873 | A1 | 9/2017 | Koravadi |
| 2017/0280091 | A1 * | 9/2017 | Greenwood ....... H04N 5/23238 |
| 2017/0317748 | A1 | 11/2017 | Krapf |
| 2017/0329346 | A1 | 11/2017 | Latotzki |
| 2018/0154831 | A1 * | 6/2018 | Spencer ............. H04N 5/23238 |
| 2018/0215382 | A1 | 8/2018 | Gupta et al. |
| 2018/0253608 | A1 * | 9/2018 | Diessner ................ B60R 1/003 |
| 2018/0276838 | A1 | 9/2018 | Gupta et al. |
| 2018/0276839 | A1 | 9/2018 | Diessner et al. |
| 2019/0016264 | A1 | 1/2019 | Potnis et al. |

* cited by examiner

METHOD FOR DETECTING AN OBJECT VIA A VEHICULAR VISION SYSTEM

CROSS REFERENCE TO RELATED APPLICATIONS

The present application is a continuation of U.S. patent application Ser. No. 15/886,871, filed Feb. 2, 2018, now U.S. Pat. No. 11,034,295, which claims the filing benefits of U.S. provisional application Ser. No. 62/453,761, filed Feb. 2, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or autonomous vehicle control system for a vehicle that utilizes one or more cameras (preferably one or more CMOS cameras) to capture image data representative of images exterior of the vehicle, and processes image data captured from multiple cameras viewing a common region exterior the vehicles, whereby the image data captured by additional cameras at the vehicle can be used to detect objects and to determine the location of detected objects in three dimensional space.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
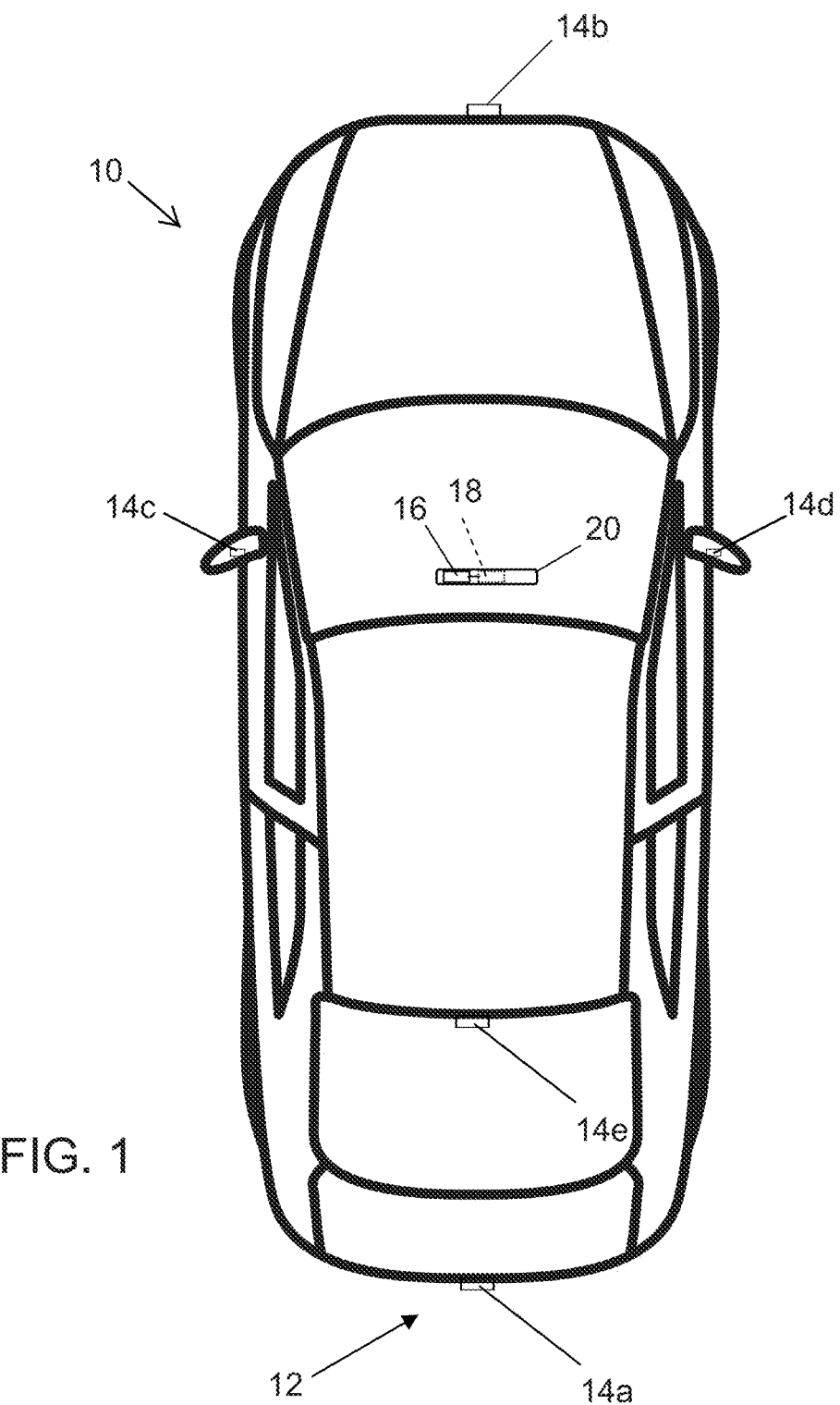
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). In the illustrated embodiment, the system includes a second rearward viewing camera 14e that is disposed at a center high mounted stop lamp (CHMSL) location at the vehicle. The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
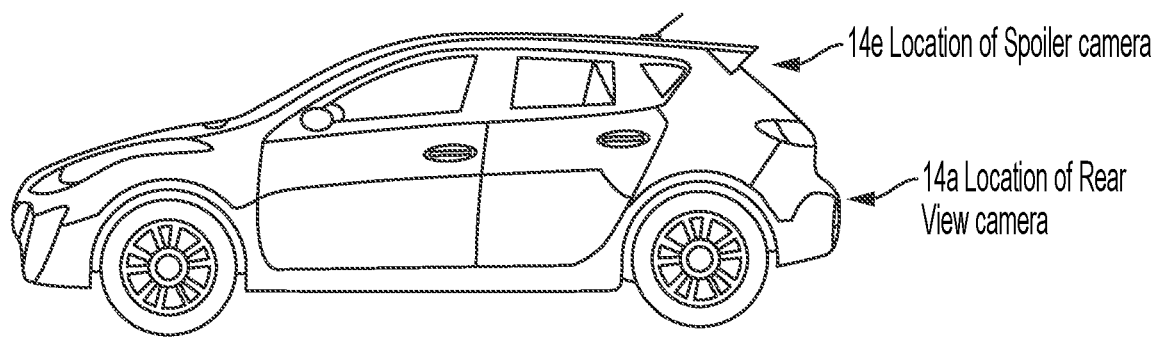
FIG. 2 is a side elevation of a vehicle showing a first rearward viewing camera at a rear bumper of the vehicle and a second rearward viewing camera at a spoiler of the vehicle.
Figure 3:
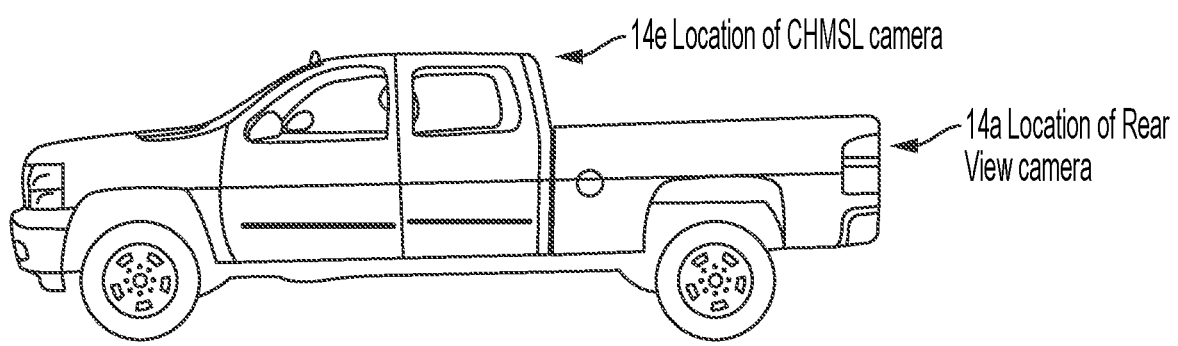
FIG. 3 is a side elevation of a vehicle showing a first rearward viewing camera at a rear bumper or tailgate of the vehicle and a second rearward viewing camera at a CHMSL location of the vehicle.
Figure 4:
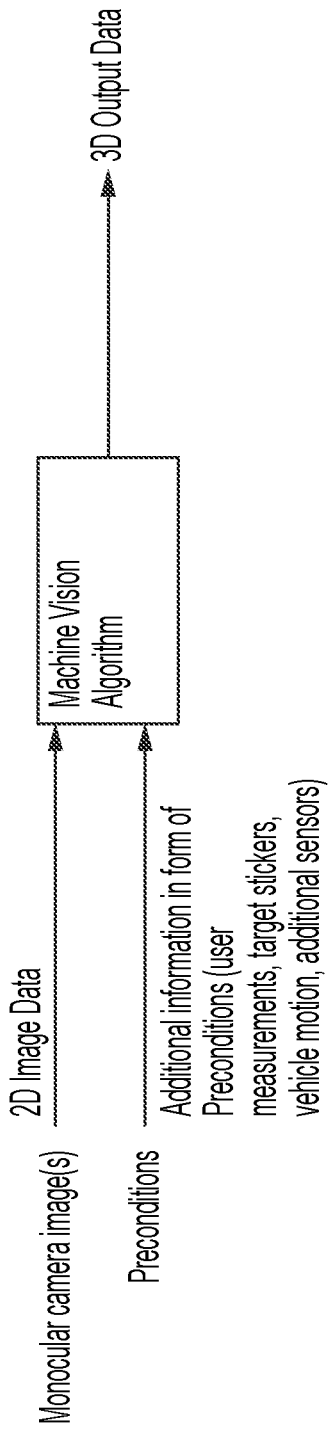
FIG. 4 is a block diagram showing that image data captured by a single camera and preconditions are used to provide three dimensional (3D) output data.
Figure 5:
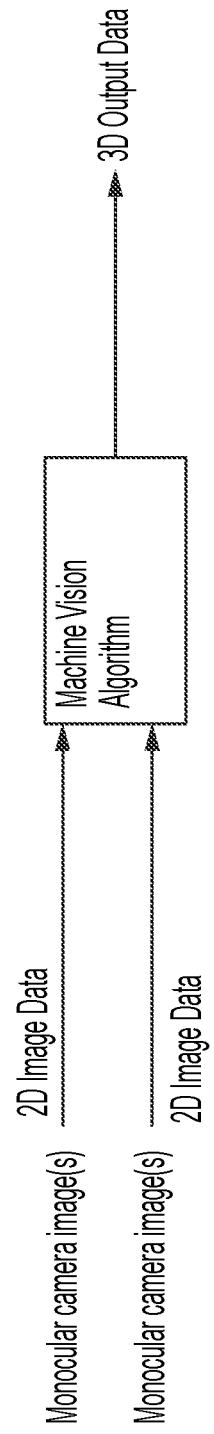
FIG. 5 is a block diagram showing that image data captured by two cameras are used to provide three dimensional (3D) output data.

The amount of exterior cameras is increasing in vehicles, with many vehicles having four or more surround view cameras 14a-d. Additional cameras in the CHMSL or rear spoiler area are included in some vehicles (such as camera 14e in FIGS. 1-3). Machine vision algorithms used in object detection functions utilize one camera and require therefore additional data in order to perform three dimensional detection. These additional inputs stipulate pre-conditions for the machine vision algorithm. For example, for a trailer angle detection (TAD) function, a target sticker and user measurements may be required, while for an object detection function, vehicle motion may be required for accurate object location calculation. The pre-conditions are used to augment the two dimensional image data in order to be able to calculate three dimensional output data utilizing the machine vision algorithm (see FIG. 4).

In order to provide better algorithm performance and user friendliness, such preconditions should be removed. This will increase customer satisfaction and improve better algorithm performance. For example, removal of user measurements and target sticker requirements for trailer angle detection will improve customer satisfaction and is a cost saving (no target sticker). Similarly, removal of a vehicle motion requirement will allow for 3D detection of objects in static conditions (where the vehicle is static or non-moving and the object is static or non-moving), resulting in enhanced object detection performance compared to current systems.

The vision system of the present invention uses image data captured by two (or more cameras) to detect object data in three dimensions. Thus, instead of using additional information associated with pre-conditions, the image data of additional cameras at the vehicle can be used to detect object data in three dimensions. The locations of the cameras at the vehicle in 3D space is known and/or can be derived from the design mounting location and extrinsic camera location calibration algorithms.

The location of the cameras in 3D space allows the system to determine the optical base between the cameras. The optical base and the image data captured by the two cameras can be utilized with stereoscopic detection algorithms as long as the objects of interest are present in the fields of view of both cameras and visible in both camera captured images. The stereoscopic detection principle that uses two cameras can be extended to multiple cameras as long as the object of interest is present in the fields of views of each of the cameras and visible in the camera images. Increasing the number of cameras will increase the detection confidence and accuracy.

The system of the present invention may be used in various applications/features that would benefit from this technology. For example, the system may be used for trailer angle detection, where detection and calculation of the angle between a tow vehicle and a trailer can be made by processing image data captured by two rearward viewing cameras. Also, for example, the system may be used for trailer hitch assist, which is a feature that autonomously maneuvers a vehicle in reverse and aligns the tow ball and trailer hitch automatically for trailer hitching (such as a system that utilizes aspects of the systems described in U.S. patent application Ser. No. 15/885,855, filed Feb. 1, 2018 and published as U.S. Publication No. US-2018-0215382, which is hereby incorporated herein by reference in its entirety). Also, for example, the system may be used to enhance object detection to provide detection of objects and their location relative to the equipped vehicle in 3D space. This feature is commonly used for autopark and reverse automated emergency braking systems and the like. The system may also be used enhance pedestrian and/or vehicle detection and classification, which provides detection and classification of pedestrians and vehicles and their location relative to the equipped vehicle in 3D space. This feature is commonly used for autopark and reverse automated emergency braking systems and the like. Also, the system may be used to enhance blind spot detection to detect vehicles located in a blind spot area at the side and rear of the equipped vehicle. The system may also be used to enhance autonomous vehicle control features, with all features that allow autonomous maneuvering of a vehicle utilizing the detection of objects in the vehicle environment.

Therefore, the vision system of the present invention utilizes two separate spaced apart cameras that have overlapping fields of view. For example, the system may utilize two rearward viewing cameras, both disposed at a rear center region of the vehicle, but spaced vertically apart, such as one at the vehicle bumper and one at a spoiler of the vehicle or at a center high mounted stop lamp of the vehicle or the like. The system may include more rearward viewing cameras, such as two additional rearward viewing cameras spaced laterally apart and towards opposite sides of the vehicle, and at a known height relative to the two center cameras, to further enhance three dimensional sensing.

Modern vehicles, such as autonomous vehicles, may be equipped with up to eight or more cameras viewing exterior of the vehicle, such as a tri-camera/tri-focal camera disposed at the windshield of the vehicle and viewing forward through the windshield, two cameras at each side, and one at the rear (in addition to a rear backup camera). Such cameras, when disposed at a particular vehicle model are disposed at a set, determined location (such as at respective coordinates of a vehicle coordinate system) and thus the distance between any two cameras is known and set for any given vehicle.

When the equipped vehicle is driven on a road (or when the equipped vehicle is parked), an object or other vehicle present in the fields of view of two (or more) of the cameras is seen by the two (or more) cameras. Because the distance (in a lateral direction and vertical direction or height) between the spaced apart cameras is known, the system can use stereo vision processing of image data captured by those cameras to determine the location of the object or other vehicle in three dimensional space relative to the equipped vehicle. By using two or more cameras that have fields of view encompassing a common exterior region (such as rearward or sideward or forward of the vehicle), the system of the present invention can process image data captured by the cameras at the overlapping fields of view to detect objects present in the overlapping fields of view with enhanced three dimensional sensing and enhanced distance sensing and the like.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017847; US-2017-0015312 and/or US-2015-0344028, which are hereby incorporated herein by reference in their entireties.

The system may utilize aspects of the trailering or trailer angle detection systems described in U.S. Pat. Nos. 9,085,261 and/or 6,690,268, and/or U.S. Publication Nos. US-2017-0254873; US-2017-0217372; US-2017-0050672; US-2015-0217693; US-2014-0160276; US-2014-0085472 and/or US-2015-0002670, and/or U.S. provisional applications, Ser. No. 62/533,694, filed Jul. 18, 2017, Ser. No. 62/518,765, filed Jun. 13, 2017, Ser. No. 62/474,646, filed Mar. 22, 2017, Ser. No. 62/474,645, filed Mar. 22, 2017, Ser. No. 62/474,644, filed Mar. 22, 2017, Ser. No. 62/466,449, filed Mar. 3, 2017, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484 and/or U.S. Publication Nos. US-2018-0015875; US-2017-0356994; US-2017-0315231; US-2017-0276788; US-2017-0254873; US-2017-0222311 and/or US-2010-0245066, and/or U.S. patent application Ser. No. 15/675,919, filed Aug. 14, 2017, now U.S. Pat. No. 10,641,867, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for detecting an object via a vehicular vision system, the method comprising:

disposing a first camera at a first location at a rear portion of a vehicle so as to have a first field of view exterior and at least rearward of the vehicle;

disposing a second camera at a second location at another rear portion of the vehicle so as to have a second field of view exterior and at least rearward of the vehicle;

wherein the first location is vertically spaced from the second location and is at a higher elevation relative to ground than the second location;

wherein the first location is vertically spaced from the second location by a vertical separation distance;

wherein the first location is horizontally spaced from the second location by a horizontal separation distance;

wherein, with the first and second cameras disposed at the respective first and second locations, the first field of view at least partially overlaps the second field of view;

providing an electronic control unit (ECU) comprising an image processor operable to process image data captured by the first and second cameras;

capturing image data via the first and second cameras and providing captured image data to the ECU;

processing at the ECU of image data captured by the first and second cameras; and responsive to processing at the ECU of image data captured by the first and second cameras and based on the horizontal and vertical separation distances, determining via the ECU (i) presence of an object in an overlapping region of the first and second fields of view and (ii) location of the object relative to the vehicle.

2. The method of claim 1, wherein disposing the first and second cameras at the respective first and second locations comprises disposing the first and second cameras at a centerline of the vehicle.

3. The method of claim 2, wherein disposing the first and second cameras at the respective first and second locations comprises spacing the first and second cameras longitudinally apart at the vehicle.

4. The method of claim 1, wherein disposing the second camera at the second location comprises disposing the second camera at a bumper of the vehicle.

5. The method of claim 4, wherein disposing the first camera at the first location comprises disposing the first camera above the bumper of the vehicle.

6. The method of claim 4, wherein disposing the first camera at the first location comprises disposing the first camera at a spoiler of the vehicle.

7. The method of claim 4, wherein disposing the first camera at the first location comprises disposing the first camera at a center high mounted stop lamp of the vehicle.

8. The method of claim 1, wherein determining location of the object relative to the vehicle comprises determining, via the ECU, the location of the object in three dimensional space relative to the vehicle.

9. The method of claim 1, further comprising generating, via the ECU, and responsive to determination of the presence of the object in the overlapping region of the first and second fields of view, an output for a driving assistance system of the vehicle.

10. The method of claim 9, wherein the driving assistance system comprises at least one selected from the group consisting of (i) a trailer angle detection system of the vehicle and (ii) a trailer hitch assist system of the vehicle.

11. The method of claim 9, wherein the driving assistance system comprises at least one selected from the group consisting of (i) a parking assist system of the vehicle and (ii) a blind spot detection system of the vehicle.

12. The method of claim 1, further comprising generating, via the ECU, and responsive to determination of the presence of the object in the overlapping region of the first and second fields of view, an output for an autonomous control system of the vehicle.

13. A method for detecting an object via a vehicular vision system, the method comprising:

disposing a first camera at a first location at a rear portion of a vehicle so as to have a first field of view exterior and at least rearward of the vehicle;

disposing a second camera at a second location at another rear portion of the vehicle so as to have a second field of view exterior and at least rearward of the vehicle;

wherein the first location is vertically spaced from the second location and is at a higher elevation relative to ground than the second location;

wherein the first location is vertically spaced from the second location by a vertical separation distance;

wherein the first location is horizontally spaced from the second location by a horizontal separation distance;

wherein, with the first and second cameras disposed at the respective first and second locations, the first field of view at least partially overlaps the second field of view;

providing an electronic control unit (ECU) comprising an image processor operable to process image data captured by the first and second cameras;

capturing image data via the first and second cameras and providing captured image data to the ECU;

processing at the ECU of image data captured by the first and second cameras;

responsive to processing at the ECU of image data captured by the first and second cameras and based on the horizontal and vertical separation distances, determining via the ECU (i) presence of a pedestrian in an overlapping region of the first and second fields of view and (ii) location of the pedestrian relative to the vehicle; and generating, via the ECU, and responsive to determination of the presence of the pedestrian in the overlapping region of the first and second fields of view, an output for a parking assist system of the vehicle.

14. The method of claim 13, wherein disposing the first and second cameras at the respective first and second locations comprises disposing the first and second cameras at a centerline of the vehicle.

15. The method of claim 14, wherein disposing the first and second cameras at the respective first and second locations comprises spacing the first and second cameras longitudinally apart at the vehicle.

16. The method of claim 13, wherein disposing the second camera at the second location comprises disposing the second camera at a bumper of the vehicle.

17. The method of claim 13, wherein disposing the first camera at the first location comprises disposing the first camera above a bumper of the vehicle.

18. The method of claim 13, wherein disposing the first camera at the first location comprises disposing the first camera at a center high mounted stop lamp of the vehicle.

19. A method for detecting an object via a vehicular vision system, the method comprising:

disposing a first camera at a first location at a rear portion of a vehicle so as to have a first field of view exterior and at least rearward of the vehicle;

disposing a second camera at a second location at another rear portion of the vehicle so as to have a second field of view exterior and at least rearward of the vehicle;

wherein the first location is vertically spaced from the second location and is at a higher elevation relative to ground than the second location;

wherein the first location is vertically spaced from the second location by a vertical separation distance;

wherein the first location is horizontally spaced from the second location by a horizontal separation distance;

wherein, with the first and second cameras disposed at the respective first and second locations, the first field of view at least partially overlaps the second field of view;

providing an electronic control unit (ECU) comprising an image processor operable to process image data captured by the first and second cameras;

capturing image data via the first and second cameras and providing captured image data to the ECU;

processing at the ECU of image data captured by the first and second cameras;

responsive to processing at the ECU of image data captured by the first and second cameras and based on the horizontal and vertical separation distances, determining via the ECU (i) presence of a trailer in an overlapping region of the first and second fields of view and (ii) location of the trailer relative to the vehicle; and generating, via the ECU, and responsive to determination of the location of the trailer in the overlapping region of the first and second fields of view, an output for a trailer hitch assist system of the vehicle.

20. The method of claim 19, wherein disposing the first and second cameras at the respective first and second locations comprises disposing the first and second cameras at a centerline of the vehicle.

21. The method of claim 20, wherein disposing the first and second cameras at the respective first and second locations comprises spacing the first and second cameras longitudinally apart at the vehicle.

22. The method of claim 19, wherein disposing the second camera at the second location comprises disposing the second camera at a bumper of the vehicle.

23. The method of claim 19, wherein disposing the first camera at the first location comprises disposing the first camera above a bumper of the vehicle.

24. The method of claim 19, wherein disposing the first camera at the first location comprises disposing the first camera at a center high mounted stop lamp of the vehicle.

* * * * *